United States Patent
Molenaar (10) Patent No.: US 8,468,446 B2
(45) Date of Patent: Jun. 18, 2013

(54) DYNAMIC METHOD FOR GENERATING XML DOCUMENTS FROM A DATABASE

(75) Inventor: Rick Molenaar, Nice (FR)

(73) Assignee: Amadeus S.A.S, Sophia Antipolis (FR)

( * ) Notice: Subject to any disclaimer, the term of this patent is extended or adjusted under 35 U.S.C. 154(b) by 890 days.

(21) Appl. No.: 11/914,017

(22) PCT Filed: May 5, 2006

(86) PCT No.: PCT/EP2006/062102
§ 371 (c)(1),
(2), (4) Date: Jun. 3, 2008

(87) PCT Pub. No.: WO2006/122886
PCT Pub. Date: Nov. 23, 2006

(65) Prior Publication Data
US 2009/0265608 A1    Oct. 22, 2009

Related U.S. Application Data

(60) Provisional application No. 60/679,232, filed on May 10, 2005.

(30) Foreign Application Priority Data

May 9, 2005 (EP) .................................. 05103829

(51) Int. Cl.
*G06F 17/27* (2006.01)
*G06F 17/28* (2006.01)

(52) U.S. Cl.
USPC .......................................... 715/234; 715/235

(58) Field of Classification Search
USPC ....................................................... 715/234
See application file for complete search history.

(56) References Cited

U.S. PATENT DOCUMENTS

| 5,835,712 | A  | * | 11/1998 | DuFresne ...................... 709/203 |
| 6,636,845 | B2 | * | 10/2003 | Chau et al. ........................... 1/1 |
| 6,708,186 | B1 | * | 3/2004  | Claborn et al. ............... 707/754 |
| 6,826,727 | B1 | * | 11/2004 | Mohr et al. .................... 715/235 |
| 6,941,510 | B1 | * | 9/2005  | Ozzie et al. ................... 715/234 |
| 7,076,534 | B1 | * | 7/2006  | Cleron et al. ................. 709/219 |
| 7,194,678 | B1 | * | 3/2007  | Koike et al. ................... 715/234 |
| 7,458,022 | B2 | * | 11/2008 | Ramarao ....................... 715/236 |

(Continued)

OTHER PUBLICATIONS

Shanmugasundaram et al., "Efficiently Publishing rational Data as XML Documents", 2001, VLDB Journal, pp. 133-154.*

(Continued)

*Primary Examiner* — James Debrow
(74) *Attorney, Agent, or Firm* — Wood, Herron & Evans, LLP (57) ABSTRACT

The invention describes a method for automatically generating XML documents containing data extracted from a database source. The method consists of defining a number of templates in the format of the database, these templates containing executable statements. Queries associated with each of the templates are also defined. The queries are used for extracting data from the data of the source database in the form of sets of records. The execution of statements of the templates generates at least one XML document that contains the data from the sets of records. By using a call instruction, a template can call any of the other templates for creating an XML document. The inventive method realizes a dynamic definition for accessing data from the database with the aid of nested templates operating directly from the database.

19 Claims, 7 Drawing Sheets

U.S. PATENT DOCUMENTS

| | | | |
|---|---|---|---|
| 7,496,840 B2* | 2/2009 | Hailey et al. | 715/243 |
| 7,500,185 B2* | 3/2009 | Hu | 715/235 |
| 7,536,425 B2* | 5/2009 | Moore et al. | 1/1 |
| 7,640,497 B1* | 12/2009 | Black | 715/249 |
| 2002/0143727 A1 | 10/2002 | Hu et al. | |
| 2003/0014397 A1* | 1/2003 | Chau et al. | 707/3 |
| 2004/0002907 A1* | 1/2004 | Tosswill | 705/34 |
| 2004/0268238 A1* | 12/2004 | Liu et al. | 715/513 |
| 2005/0022116 A1* | 1/2005 | Bowman et al. | 715/513 |
| 2006/0048096 A1* | 3/2006 | Jiang et al. | 717/115 |
| 2006/0184571 A1* | 8/2006 | Liu et al. | 707/103 R |
| 2006/0242563 A1* | 10/2006 | Liu et al. | 715/513 |
| 2007/0198919 A1* | 8/2007 | Clarke et al. | 715/513 |
| 2011/0209038 A1* | 8/2011 | Travieso et al. | 715/205 |

OTHER PUBLICATIONS

Shin et al., "Generating XSLT Scripts for the Fast Transformation of XML Document", ACM, 2005, pp. 1098-1099.*

KIPO, Notification of Ex Officio Provisional Refusal issued in related Korean Aplication No. 10-2007-7028879 dated Oct. 26, 2012.

* cited by examiner

... *Start previous page...*

742
- Construct the parameter group. Obtain the parameter called 'P_Codeslist' and find the field 'Name': CAR_CHARGE_PERIOD_TYPE_CODE
- Obtain the query definition 'qryXML_Gen_CodesList_Item'
- Apply the parameter to the value of the group of parameters
- Open the set of instructions
  - Find the instructions of the template
    - Process the instructions for each record of the set of records, as described previously. We then have.

```
<codes_list>
    <list name="CAR_CHARGE_PERIOD_TYPE_CODE" area="Car">
        <item code="001" desc="Per Day"/>
        <item code="002" desc="Per Week"/>
        <item code="003" desc="Per Month"/>
        <item code="004" desc="Per Rental"/>
        <item code="005" desc="Per Hour"/>
        <item code="006" desc="Per Minute"/>
    </list>
</codes_list>
```
—760

- Process the instruction of the close element type
  - Process the subsequent records in an identical manner

750

Result of the Query CarcodesList_Item (Set of records)

| CodesList | Code | Value |
|---|---|---|
| CAR_CHARGE_PERIOD_TYPE_CODE | 001 | Per Day |
| CAR_CHARGE_PERIOD_TYPE_CODE | 002 | Per Week |
| CAR_CHARGE_PERIOD_TYPE_CODE | 003 | Per Month |
| CAR_CHARGE_PERIOD_TYPE_CODE | 004 | Per Rental |
| CAR_CHARGE_PERIOD_TYPE_CODE | 005 | Per Hour |
| CAR_CHARGE_PERIOD_TYPE_CODE | 006 | Per Minute |

FIG. 7B

DYNAMIC METHOD FOR GENERATING XML DOCUMENTS FROM A DATABASE

TECHNICAL SCOPE OF THE INVENTION

This invention relates generally to databases generated by computers, and more particularly to the automatic generation of documents of the type using markup language XML, "extensible Markup Language", when interrogating databases.

STATE OF THE ART

Databases generated directly from computers or through a network have been used for a very long time by numerous companies, administrations and all kinds of commercial or other organisations. Databases are entities wherein it is possible to store data in a structured manner with the least possible redundancy. The major advantage of using databases is therefore the fact that they can be accessed by a number of different users simultaneously.

For example, there are databases that contain all the timetables and the status of reservations of the flights of all the airlines throughout the world, or all the offers of international hotel chains. Travel agencies may then access this information from anywhere in the world, particularly now that the Internet allows all private or public networks to be interconnected. Therefore the concept of a database is generally linked to that of a network in order to be able to combine and share this information.

In order to control the data, as well as the users, a database management system (DBMS) is required. The DBMS is an assembly of software applications that enable databases to be managed, i.e. to allow simple access to the data, authorise access to the information for multiple users, and to handle the data present in the database (entry, deletion, modification).

In most cases databases are constructed according to a so-called relational model, which organises the data in the form of tables. The data are handled according to the mathematical concept based on the theory of assemblies, i.e. relational algebra, which consists of an assembly of formal operations on the relations. The relational operations enable a new relation (table) to be created from elementary operations on other tables (for example, combination, intersection, or even difference).

A structured language of queries has also been widely adopted. Known under the abbreviation SQL, "Structured Query Language", it is at the same time a data definition language and a data handling and control language. The definition of data is the work of the administrator. Most people who use the SQL language only use the data handling language, which enables them to select the data of interest to them. From the user's point of view the most important command for the data handling language is the SELECT command. Based on relational algebra, it enables data selection operations to be carried out on several relational tables in order to make them available to the user.

With the extraordinary development of the Internet, and the interlinking of public and private networks it has allowed, the exchange of data has been standardised by the adoption of a protocol called HTTP, "Hyper Text Transfer Protocol", and through the development of a communication system known under the name of Web, the "World Wide Web". The World Wide Web allows information to be searched, it allows access to this information and its visualisation using hypertext or HTML, "Hyper Text Markup Language". This language enables hypertext documents to be created that can be displayed by a Web browser.

The HTML language is a special, very simple version of a much more sophisticated standard adopted in the 1980s to describe documents and their formatting, known under the abbreviation SGML, "Standard Generalized Markup Language". The SGML language is a symbolic language which is still used to describe the logical structure of a document, and not its topographical aspect. The principle applied is generic marking, by means of markers, of chapters, paragraphs, preface, introduction and other components of a document. Although the simplicity of the HTML language has contributed largely to its adoption, and was wholly adequate at the beginning of the Web's development, the requirement for more demanding applications quickly demonstrated its limits. Because the simplicity of HTML was achieved at the cost of absence of scope for further development, the need was felt very soon for a language that offered possibilities of development and adaptation similar to the standard from which HTML was derived, i.e. SGML, but avoiding the complexity of the latter. The response to this was a new standard proposed at the end of 1996 by the organisation entrusted with the task of standardising the Web, this standard being known as XML, "extensible Markup Language". Just as SGML, but without its complexity, XML is a metalanguage which enables the HTML language to be extended. In particular, it enables new markers to be defined, for example, for a clearer description of a text, and it enables documents to be fully personalised. The success of XML lies in its ability to describe any data domain thanks to its extensibility. It enables the vocabulary and syntax of the data it contains to be structured and established.

It is therefore not surprising that the XML language has been used since its creation for formatting documents containing data derived from databases, particularly relational databases described above. Data obtained by means of SQL queries.

However, the use of the data obtained, and their inclusion in documents for their display in a window opened by the Web browser of a user, may require major coding work. In the example already quoted above, of databases interrogated by travel agencies, the users, the required level of personalisation of the display may be very high. In fact, the customers of these travel agencies have highly varied requirements. Depending on whether they are holidaymakers or businessmen or -women, the selection of the data and their presentation may be very different in order to facilitate the work of the staff in these agencies, increase their productivity and result in greater customer satisfaction.

The automatic generation of XML documents has therefore attracted particular attention from the developers of these applications. Reference may be made, for example, to a patent issued by the American Patent Office (USPTO) under number U.S. Pat. No. 6,636,845, which describes a method for generating XML documents from a single SQL query "Generating one or more XML documents from a single SQL query". However, the method described lacks flexibility. In particular, it relies upon a static definition to describe access to the data. Therefore there are as many definitions as types of data to be accessed in the corresponding XML documents.

OBJECT OF THE INVENTION

The general object of the invention is to propose an improved method for generating XML documents from a database.

A particular object of the invention is to be able to generate an XML document from a dynamic definition of access to the data in the database.

Another object of the invention is to obtain this dynamic definition by using a combination of nested templates described in the database format.

A further object of the invention is to simply and reduce the number of XML documents to be generated for an application whilst maintaining a high degree of personalisation.

The other objects, characteristics and advantages of this invention will be apparent to the persons skilled in the art on examining the following description and accompanying drawings. It is understood that other advantages may be incorporated.

SUMMARY OF THE INVENTION

A method for automatically generating at least one XML document that contains data extracted from a source database is described. The method consists in defining a plurality of templates in the database format; such templates contain executable instructions. Queries associated with each of the templates are also defined. The queries are used to extract data from the source database in the form of sets of records. The instructions of the templates are executed in order to generate at least one XML document that includes the data deriving from the sets of records. The instructions include at least one call instruction for calling any of the other templates. The XML documents consist of elements that include attributes. The method is characterised in that it maintains a current element concept. The method also includes an instruction to create a new element which is assigned to the current element. The new element then in turn becomes the current element. The method also includes an instruction to create a new attribute to the current element, as well as an instruction to close the current element, which consists in reassigning the role of current element to the parent element of the current element. The method includes a file definition that makes it possible to construct the name of the XML document, to create a root element which becomes the current element, and to specify which of the templates is the root template. Parameters are used to link the templates when the template call instruction is executed or when the file definition is open and the root template is used. Each of the template instructions is applied to each recording of the sets of records. The instructions are interpreted by the XML generator. The source database is a relational database and the queries are queries which obey the rules of the structured query language known as SQL. The templates, queries, instructions, file definition and parameters are contained in the form of tables in at least one relational database and may be included in the source database.

BRIEF DESCRIPTION OF THE FIGURES

The purposes, objects, as well as the characteristics and advantages of the invention will become more apparent from the detailed description of an embodiment of the invention, which is illustrated by the following accompanying drawings, wherein.

The attached drawings are given by way of example and do not limit the scope of the invention.

DETAILED DESCRIPTION OF THE INVENTION

Figure 1:
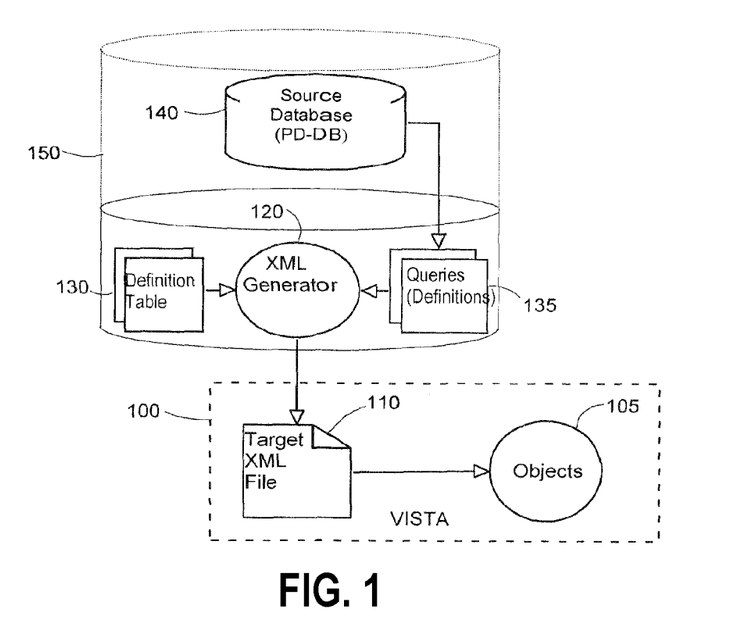
FIG. 1 shows the overall method of implementation of the invention.

FIG. 1 shows the overall method of implementation of the invention, which is used for a software application referred to below as VISTA (100), the purpose of which is to make available to remote users information extracted from a source database (140) by automatically formatting them in a form that can be easily interpreted by the browsers of these users. The database will, for example, contain the offers and status of reservations of international hotel chains. In this example the users are therefore travel agencies, which can then access this information from anywhere in the world from a public or private network via the Internet.

As discussed in the chapter on the state of the art, the XML language is the most suitable for this purpose. Proposed by the main Web standardisation organisation, i.e. W3C, the "World Wide Web Consortium", it has been very widely adopted. VISTA is therefore based on the generation of documents in the form of XML files (110) for displaying their content, thereby making the information sought available to the users. For this purpose the application (100) must read the XML files by means of a syntactic analyser (parser).

The parser is a standard tool developed and sold by software suppliers such as the well known American company the Microsoft Corporation.

Analysis of the target files generates, during the execution of the parser, objects (105) constituting pages that can be displayed by the browser of the application user.

The XML generator (120) used to generate XML files is based on models or templates (the term "templates" is used in the English technical literature on these subjects). They are stored in the definition tables (130) of the XML generator in the format and in the language of the relational database used. The templates can be nested to increase their possibility of being re-used. The templates according to the invention are sets of instructions that can be interpreted by the XML generator and can be re-used in their context. The context of a template applies to a set of records, or record set, according to the English technical terminology, i.e. to a partial view of the database obtained by means of a specific query issued to the latter. The queries conform to the structured query language (SQL) as previously discussed. According to the invention the queries are defined and stored in the database (135) in the form of objects which each provide access to a particular set of records. The query objects may contain parameters. The parameters then serve to modify the query. For example, in a database which lists all the books in a library, a query may be defined that enables the books to be searched for by the name of a particular author and thus includes an "author" parameter. For a specific search, the author parameter may then be replaced by the name of a specific author. The corresponding set of records, which will be returned by the database in response to the query, will consist of the list of books by that author held in the library.

If XML is the most suitable means of distributing the data to the users, a relational database (140) is ideal for storing the data relating to the product. The use of a well structured database guarantees easy and effective maintenance of the information it contains and prevents redundancies, in particular. The database (140) is therefore the essential source of the data that will be included in the XML files generated for users of the application (100). The method of the invention takes advantage, in particular, of the use of the structured query language SQL already mentioned. The use of templates, in the format of the database, which enables the target XML documents to be generated, does not require the distribution to the users, at the time they connect with their browsers, of the software resources that they would otherwise need to access the source database directly. This would necessarily increase the time required to access the information sought, block the network and make it very complicated to make available the information sought. In fact, although the structure and organisation of the database tend to guarantee its efficiency and avoid redundancies, the display of the information to the user meets other criteria. The matching of the structure of the data in the database to the data required by the user can just as well be carried out at the source, as recommended by the invention, by the XML generator (120), which relies upon the templates of the definition tables (110) and the associated query definitions (135) to create a small number of target XML files (110) containing sufficient information for the user.

The definition tables, the templates and queries according to the invention may be contained in a database that is separate from the source database (140), as shown diagrammatically in FIG. 1, but could just as well form part of a unique database (150) without problem.

The purpose of the invention is therefore to generate XML documents (110) from a single source (140), a relational database, managed by software applications which constitute the actual standards, of which there are numerous well known commercial variants, for example those known under the names "Oracle", "IBM DB2" or "Microsoft Access", products developed and marketed by their respective companies. The management and integrity of the data themselves are therefore provided by the use of a standard product that has been widely tested and used. Therefore, by including the rules for generating and testing XML documents in the database itself in the format of the latter, numerous advantages may be derived from this. In particular, the development time is shortened. Making changes in a database and automatically regenerating all the XML files of a given application, such as VISTA (100), therefore takes much less time than having to update and correct a specific code. Moreover, this can be carried out directly by the professionals responsible for developing the application itself, VISTA in this example, whereas the development of a specific software always requires expensive coding work by highly specialised programmers.

Figure 2:
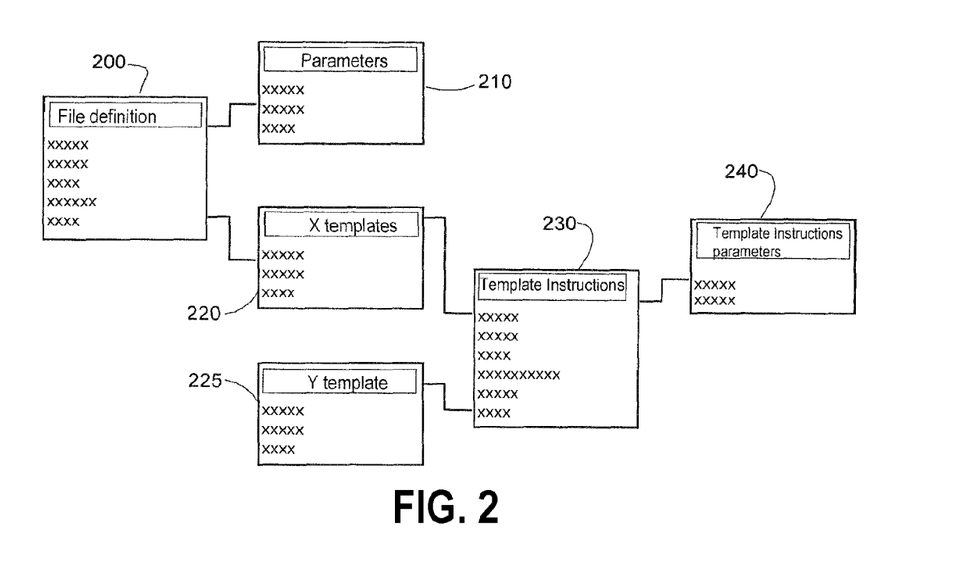
FIG. 2 describes the structure of the definition tables of the XML generator.

FIG. 2 describes the structure of the "definition tables" of the XML generator. Each table contains:

TABLE 1

| | |
|---|---|
| File Definition (200) | A file definition is required to create the target XML file.<br>The file definition includes the following information:<br>the name of the XML file to be created<br>the root template to be called<br>the associated query for finding the suitable set of records in the database<br>the root element to be created (optional)<br>the parameters (as defined below) |
| Template (220) | A template contains executable instructions as defined below. A template may call another template (225). |
| Instructions (230) | The execution instructions of a template are of several types which serve to:<br>create an XML element<br>create an XML attribute<br>close an XML element |

TABLE 1-continued

| | |
|---|---|
| Parameters (210, 240) | call a template (parameters may be specified)<br>The parameters act as links between the set of records of the calling template and that of the called template, and a distinction must be made between:<br>Parameter definition: |
| | The parameters stored in the templates (240) and file definition (210). The definition includes a name and a field name of the current record set, which will contain the value of the parameter from the following group of parameters.<br>Group of parameters: |
| | A temporary group of parameters of the set of records deriving from the database.<br>Parameters of queries: |
| | For finding the suitable set of records in the database. |

The file definition (200), which makes use of parameters (210), contains the definition of the particular query to be applied to the database to find the appropriate set of records. The file definition references a template (220) which makes use of instructions (230). When the instruction is of the type which calls another template (225), parameters must then be passed to the called template (240).

The elements and attributes of the XML document mentioned in the above table form an integral part of the XML language and are concepts well known to the persons skilled in the art. Generally an XML document will include one or more elements bounded by start and end markers in the form <xxxelement> and </Element> respectively. Each element may then have one or more attributes, each having a name and value which are specified in the template instructions.

Figure 3:
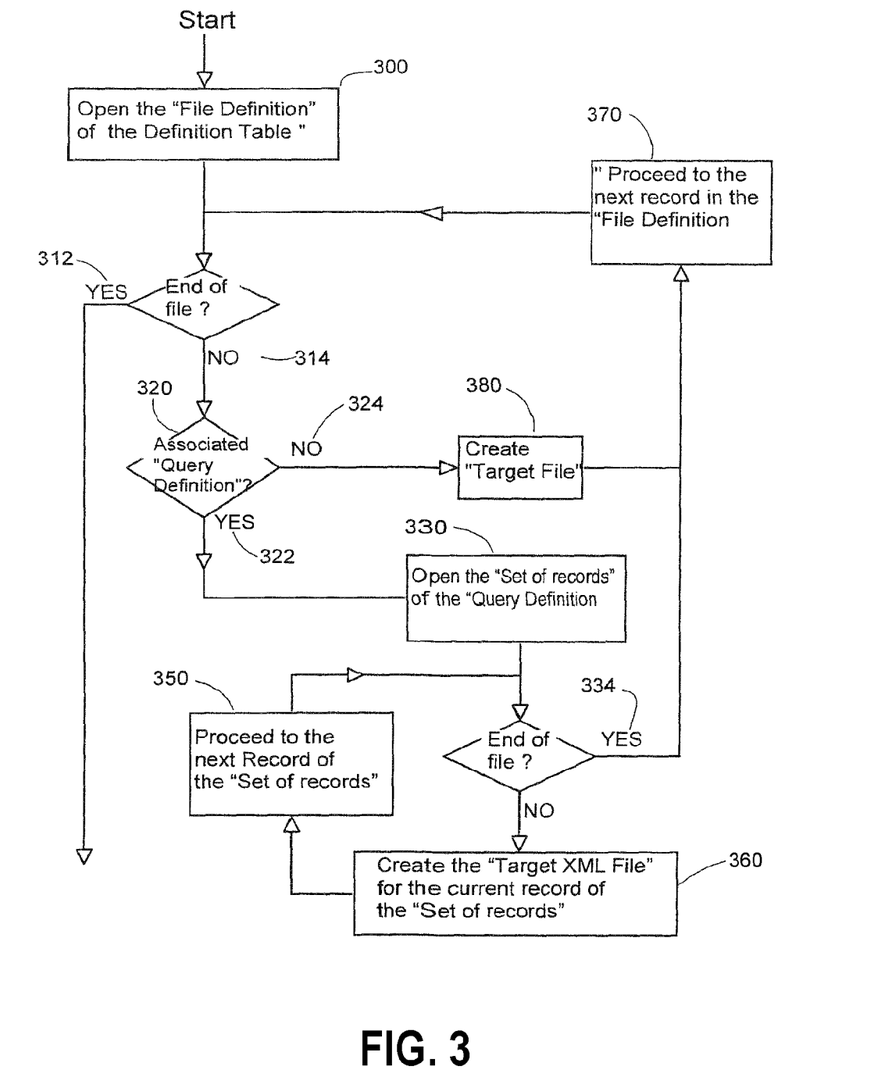
FIG. 3 describes the process which relates to the generation of the files on the basis of the content of the file definition.

FIG. 3 describes the process of generating files on the basis of the content of the "file definition" described above and forming part of a "table of definitions of the XML generator".

After the file definition (300) is opened for each record (314) for this definition, it is tested (320) whether there is an associated "query definition". If this is the case (322), the corresponding query is executed. The "set of records" obtained from the database is then opened (330). There will as many target files created (360) as there are records in the record set. All the records in the record set are scrolled through (350). When the last has been processed (334) the process passes to the next record of the file definition (370).

If, when testing for the presence of an associated query definition (320), the reply is negative (324), a single target file is then created (380) before proceeding to the next record of the file definition. If there are no further records the process is completed (312).

Figure 4:
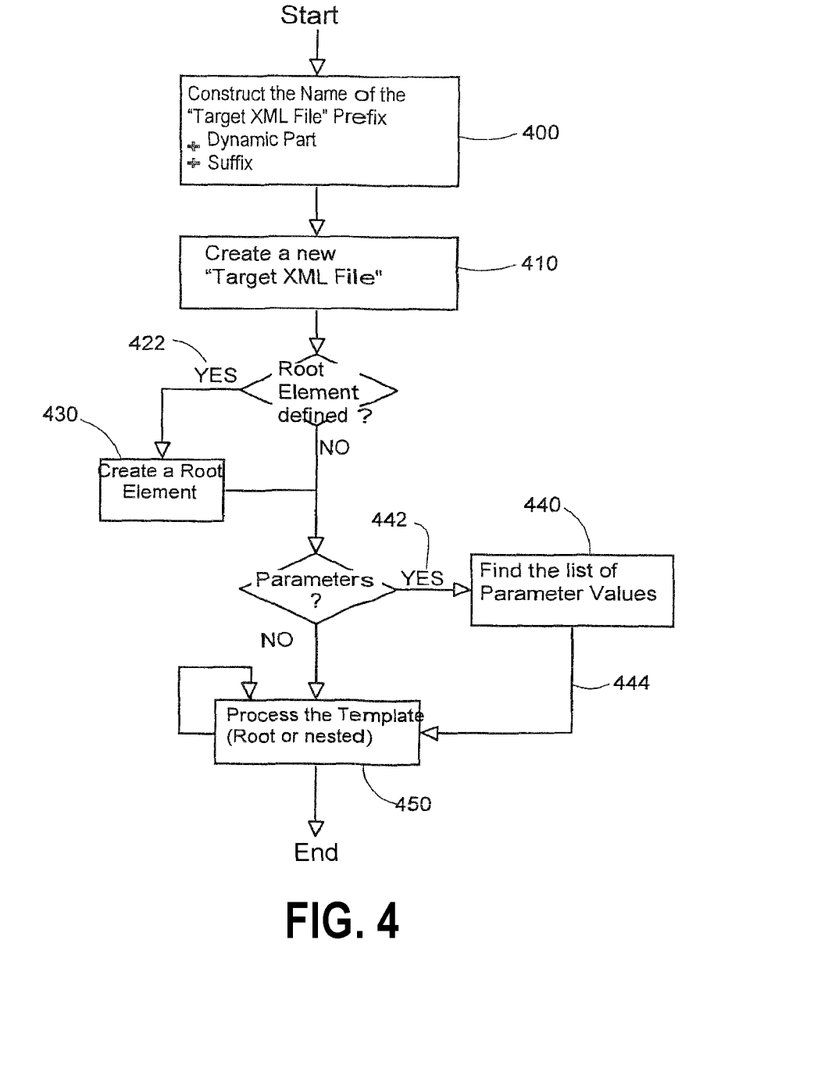
FIG. 4 descries the stage of creating the target XML file.

The "target file" creation stage (380) and similar stages for creating the "target XML file" (360) are described in FIG. 4.

The creation of the target file first of all involves constructing (400) a file name. If, as seen previously, the same "file definition" is used to create multiple target files, the construction of the name results from the concatenation:

of a prefix deriving from the file definition of a dynamic part deriving from the current record of the set of records of a suffix deriving from the file definition However, if there is no associated query definition, as has just been seen, a single file must be created. In this case only the prefix and suffix are used, there is no dynamic part.

After this the target XML file is effectively created (410) in the form of an object representing the structure of the XML document and conforming to the DOM specification (Document Object Model) issued by the Web standardisation organisation, W3C, already mentioned.

If a root element appears in the file definition (422), it is created (430). After this, if parameters are present in the file definition (442), these are located (440) for passing to the template (444).

Figure 5:
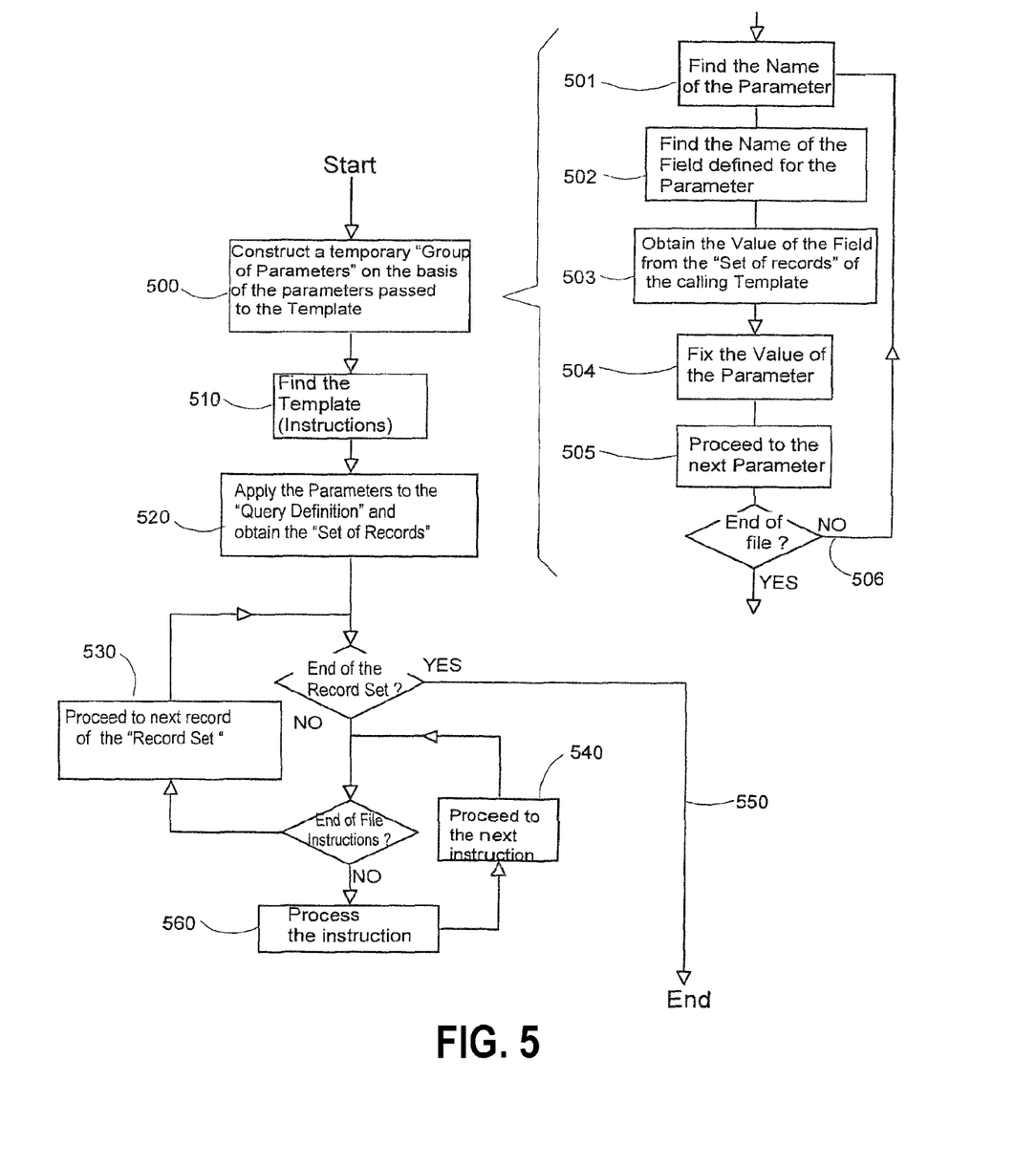
FIG. 5 describes the processing of a template.

The processing of the template (450), which may be a root template or a nested template, i.e. called by another template, is described in more detail in FIG. 5.

The parameters defined by the calling template (or the file definition) must be matched to those of the template called. For this purpose a temporary "group of parameters" is constructed (500) on the basis of the definition of the parameters. When this is done the appropriate values are obtained form the current record of the "set of records".

The stage (500) is broken down in detail in the right section of FIG. 5. Each of the parameters is found by its name (501) as well as the field defined by the parameter (502). The value of the field is obtained from the "set of records" (503), which enables the value of the parameter to be fixed (504). The process is repeated (506) as long as there are parameters (505) to be processed.

The called template is then found (510). The parameters of the associated "query definition" must be matched to those of the calling template before execution on the database in order to obtain the appropriate "set of records" (520). The parameters are applied exhaustively to each of the records in the "set of records" (530) and for each of the instructions (540) until there are no longer any instructions to be processed (560) or a record in the "set of records" (550).

Figure 6:
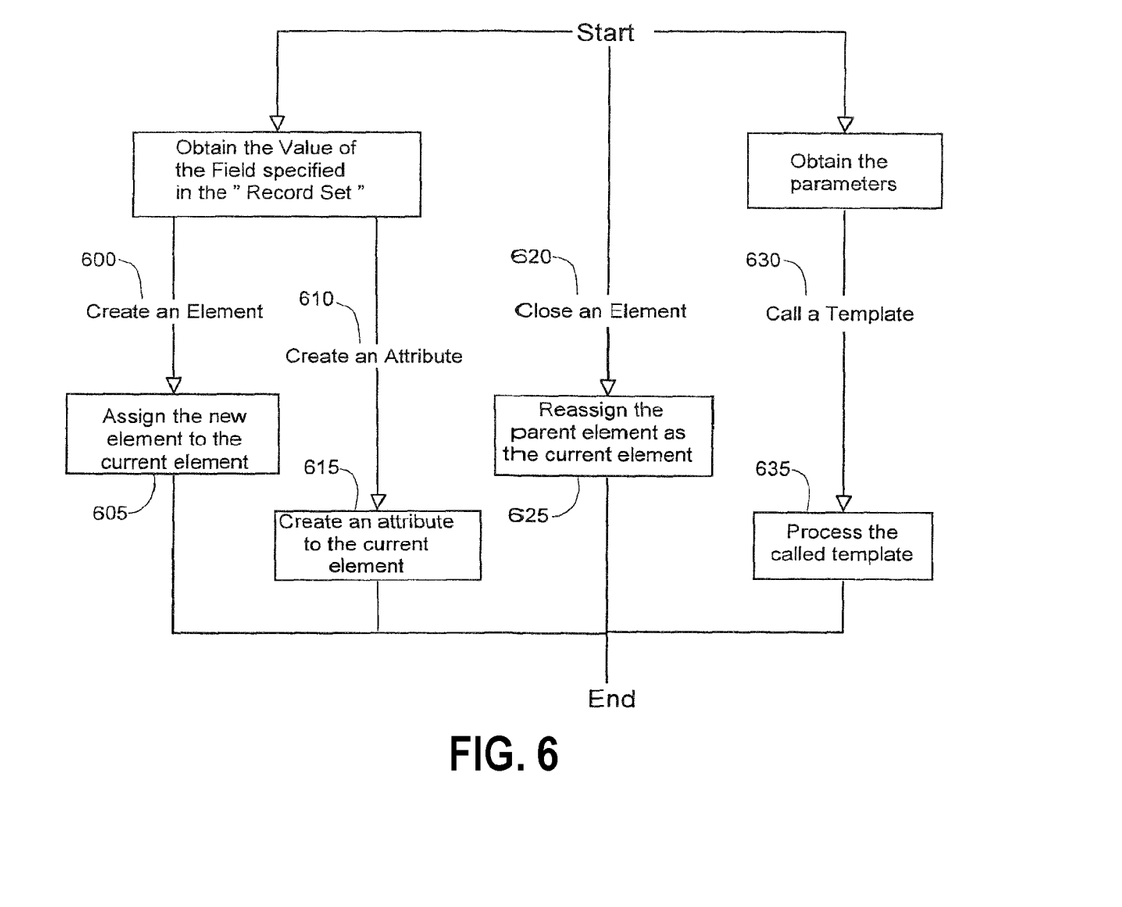
FIG. 6 describes the instructions of the templates.

FIG. 6 describes in more detail the instruction processing stage. When the instructions are executed the system maintains a current element concept. It is this element that is the target of each of the instructions described below. If there is no current element the root or first element of the template is used.

The instructions are of several types: creation of an element (600), creation of an attribute (610), closing of an element (620) and calling a template (630). In the first two cases it is first necessary to obtain (602) the value of the field specified in the current "set of records". In the last case it is first necessary to obtain (632) the parameters to be passed to the called template.

An instruction may therefore have to create an XML element (600) bearing the name constructed as previously described. The new element is then assigned to the current element (605), which therefore becomes the parent of the new child element. Optionally, a value may be inserted in the new element and this value must correspond to the field specified in the "set of records".

An instruction may have to assign an attribute (610) to an XML element. The attribute is created for the current element (615). As above, a value may optionally be fixed to this attribute, and this value must correspond to a specific field of the record set.

An instruction may close an element (620), which amounts to reassigning the role of current element (625) to the parent element.

Finally, an instruction may call a template (630) by the name previously specified. For processing the called template (635), parameters will be passed from the set of records of the current template to that of the called template.

Figure 7A:
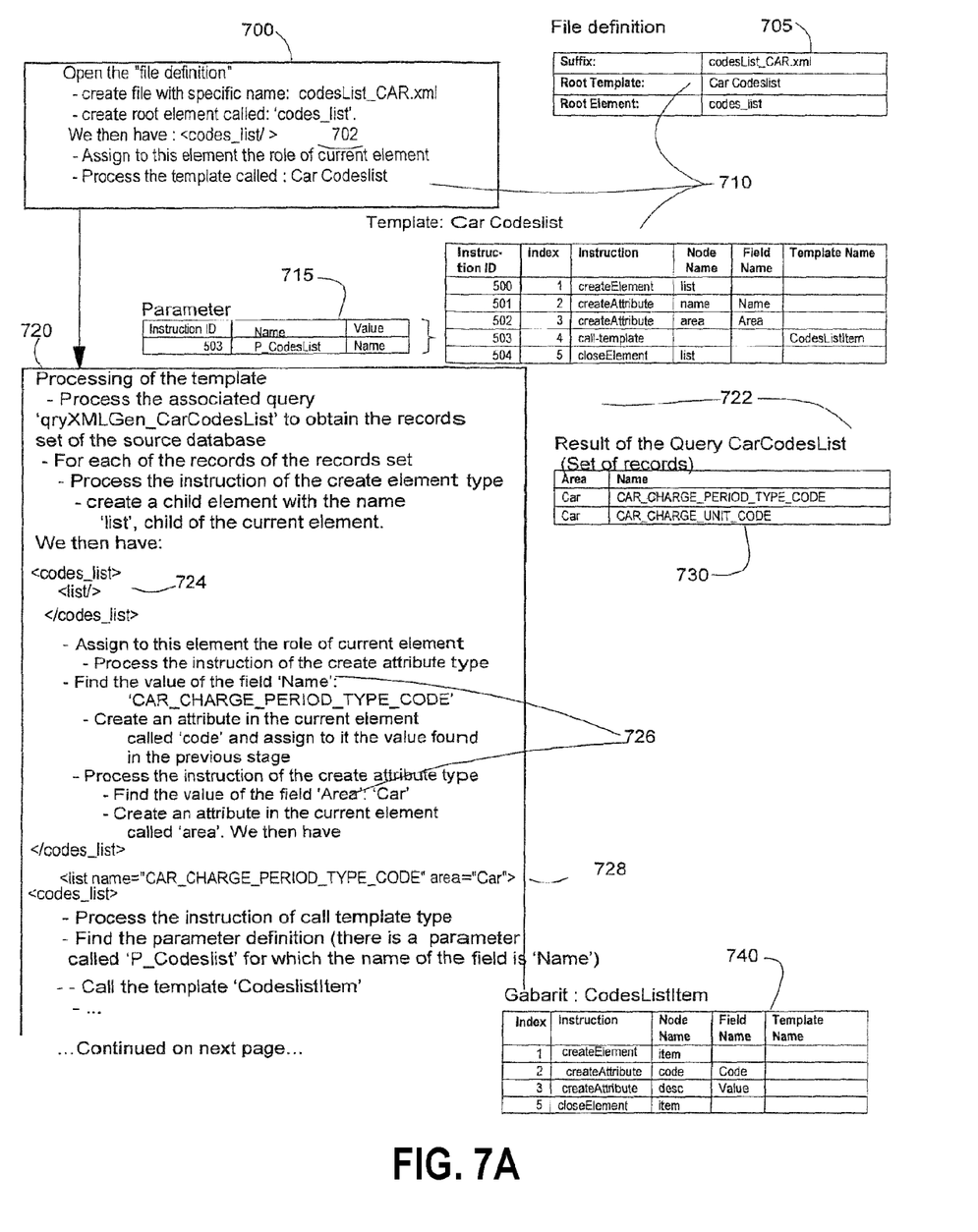
FIGS. 7A, 7B show is an exemplary embodiment of the invention.
Figure 7B:
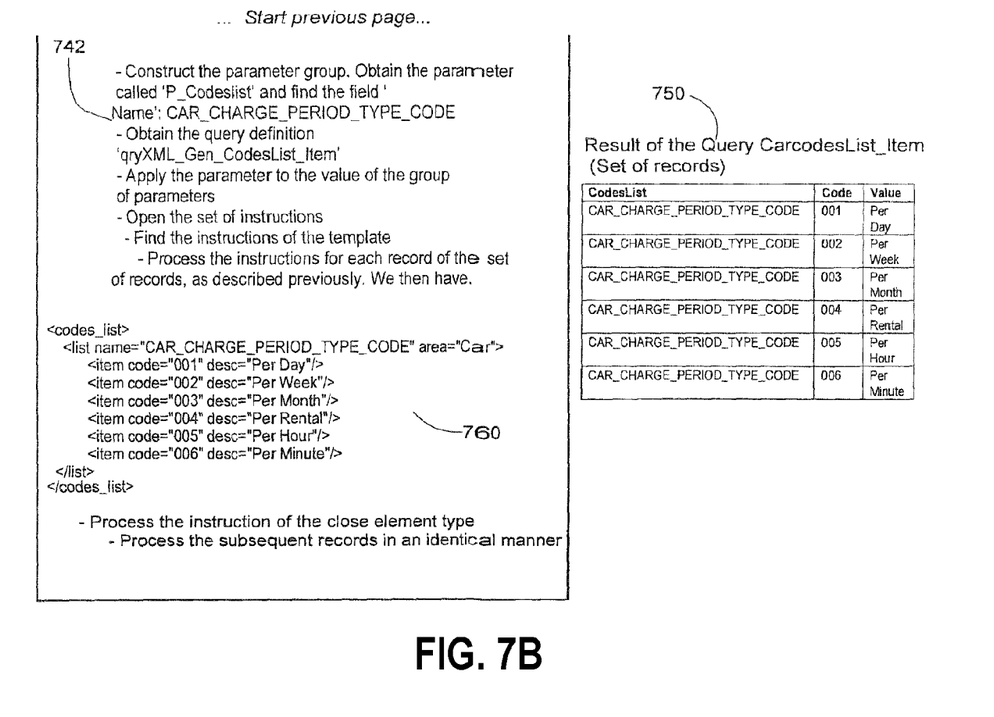

FIG. 7 illustrates, by means of a particular example, the method according to the invention for generating a target XML file from a relational database. In this example, as is almost exclusively always the case in an environment where software products are being developed which are to be marketed throughout the world by multinational teams, all the technical terms of the code are defined in English. However, this should not prevent a clear understanding of the following description. When necessary the terms are either explained or they may easily be considered to be a sequence of letters and numbers, with no particular significance, even though attempts are made to assign some meaning to them for obvious mnemonic and practical reasons.

The creation of an XML file begins with the opening (700) of the "file definition", already described, which takes the form of a table (705) in the database. With the information contained in this table it is then possible to create an XML file, with the specified name (codesList_CAR.xml), containing a first empty element (codes_list). This element becomes the current element. The file definition contains the name of the root template (710) which has been used.

The above template is then processed (720). The first stage consists in executing the query (722) defined for the template (CarCodesList), on the database, in order to obtain the corresponding set of records (730). The instructions of the template (710), 5 in this example, are applied to each of the records in the set of records thus obtained.

This starts with the creation (724) of a child element (list) of the current element previously created. This element in turn becomes the current element. The next two instructions, indexes 2 and 3, of the template (710), are then processed. They serve to create (726) two attributes (Name, Area), each corresponding to a Field Name specified in the template. The current element (list) of the XML file (728) then includes these attributes.

The next instruction, index 4 of the template (710), makes use of another template (CodesListItem), for which a parameter is defined (715). The called template (740) also has a query definition (CodesListItem), which enables the corresponding set of records (750) in the database to be obtained after the parameter of the calling template (715) has enabled the field (742) to be found for effectively executing this query.

The called template is processed in a similar manner to that already described above for enriching the XML file (760).

The invention claimed is:
1. A method comprising:
opening a file definition that defines a template including executable instructions and at least one query associated with the template, wherein the executable instructions include at least one call instruction that calls at least one other template including executable instructions and wherein the executable instructions of the template and the at least one query are in a format and with a language of a source database;
extracting data with the at least one query from the source database in the form of sets of records; and
generating an XML document for each record comprising data derived from the data of the corresponding record by:
executing the executable instructions of the template during an execution stage for each record of the set of records;
calling the at least one other template when the at least one call instruction is executed among the executable instructions of the template during the execution stage, and
executing the executable instructions of the at least one other template called by the at least one call instruction during the execution stage for each record of the set of records, wherein executing the executable instructions of the template during an execution stage for each record of the set of records comprises:
constructing a name for at least one XML document,
creating a target file for the at least one XML document,
creating a root element which is assigned a function of a current element, and
processing a root template calling any other template of a plurality of templates.

2. The method of claim 1, wherein executing the instructions of the template during the execution stage for each record of the set of records comprises:
creating an element for the at least one XML document based at least in part on a value of a field of the record; and
creating an attribute for the element based at least in part on the field specified in the record.

3. The method of claim 1, wherein executing the instructions of the template during the execution stage for each record of the set of records comprises:
creating a new child element of the, root element and assigning the function of the current element to the new child element;
creating a new attribute for the new child element; and
closing the new child element including reassigning the function of the current element to the, root element.

4. The method of claim 1, further comprising:
linking the template to the at least one other template upon calling the at least one other template based on parameters associated with the file definition and the template.

5. The method of claim 1, wherein said source database is a relational database, and the at least one query obeys the rules of a structured query language known as SQL.

6. The method of claim 1, further comprising:
linking the calling template and the at least one other template upon calling the at least one other template with parameters determined during execution of the executable instructions of the calling template.

7. The method of claim 1, wherein constructing the name for the at least one XML document comprises:
deriving a prefix and suffix from the file definition, deriving a dynamic part from the corresponding record, and concatenating the prefix, dynamic part and suffix to thereby construct the name for the at least one XML document.

8. The method of claim 1, wherein generating the corresponding XML document for each record comprising data derived from the data of the corresponding record further comprises:
prior to executing the instructions of the at least one other template during the execution stage for each record of the set of records:
obtaining a value from a field of the set of records, and
fixing a parameter value based on the value from the field of the set of records, and
passing the fixed parameter value to the called template.

9. The method of claim 1, wherein executing the instructions of the template during the execution stage for each record of the set of records further comprises executing at least one instruction that creates at least one other element.

10. The method of claim 9, wherein executing the instructions of the template during the execution stage for each record of the set of records comprises executing at least one instruction that creates an attribute.

11. The method of claim 10, wherein executing the instructions of the template during the execution stage for each record of the set of records further comprises executing at least one instruction that closes the at least one other element.

12. A system comprising:
a processor; and:
a computer program comprising program instructions configured upon execution by the processor cause the processor to:
open a file definition that defines a template including executable instructions and at least one query associated with the template, wherein the executable instructions include at least one call instruction that calls at least one other template including executable instructions, and wherein the executable instructions and the at least one query are in a format and with a language of a source database,
extract data with the at least one query from the source database in the form of a set of records, and
generate an XML document for each record comprising data derived from the data of the corresponding record by executing the executable instructions of the template during an execution stage for each record of the set of records, calling the at least one other template when the at least one call instruction is executed among the execute instructions of the template during the execution stage, and executing the executable instructions of the at least one other template called by the at least one call instruction during the execution stage for each record of the set of records execute the executable instructions of the at least one other template during the execution stage,
wherein executing the executable instructions of the template during the execution stage for each set of the set of records comprises the program instructions being configured upon execution to cause the processor to construct a name for at least one XML document, create a root element which is assigned a function a current element, and process a root template calling any other template of a plurality of templates.

13. The system of claim 12, wherein the program instructions being configured upon execution to cause the processor to generate the XML document for each record comprising data derived from the data of the corresponding record by executing the instructions of the template during an execution stage for each record of the set of records comprises:
the program instructions being configured upon execution to cause the processor to execute at least one instruction that creates at least one other element.

14. The system of claim 13, wherein the program instructions being configured upon execution to cause the processor to generate the XML document for each record comprising data derived from the data of the corresponding record by executing the instructions of the template during an execution stage for each record of the set of records comprises:
the program instructions being configured upon execution to cause the processor to execute at least one instruction that creates an attribute.

15. The system of claim 14, wherein the program instructions being configured upon execution to cause the processor to generate the XML document for each record comprising data derived from the data of the corresponding record by executing the instructions of the template during an execution stage for each record of the set of records comprises:
the program instructions being configured upon execution to cause the processor to execute at least one instruction that closes the at least one other element.

16. A non-transitory computer readable storage medium with a computer program stored thereon comprising program instructions configured upon execution by a processor to cause the processor to:

open a file definition that defines a template including executable instructions and at least one query associated with the template, wherein the executable instructions include at least one call instruction that calls at least one other template including executable instructions, and the executable instructions and the at least one query are in the format and with the language of a source database, extract data from the source database in the form of sets of records with the at least one query, and generate an XML document for each record comprising data derived from the data of the corresponding record by executing the instructions of the template during an execution stage for each record of the set of records, calling the at least one other template when the at least one call instruction is executed among the execute instructions of the template during the execution stage, and executing the executable instructions of the at least one other template called by the at least one call instruction during the execution stage for each record of the set of records execute the executable instructions of the at least one other template during the execution stage, wherein executing the executable instructions of the template during the execution stage for each record of the set of records comprises the program instructions being configured upon execution to cause the processor to construct a name for at least one XML document, create a root element which is assigned the function of current element, and process a root template calling any other template of a plurality of templates.

17. The non-transitory computer readable storage medium of claim 16, wherein the program instructions being configured upon execution to cause the processor to generate the XML document for each record comprising data derived from the data of the corresponding record by executing the instructions of the template during an execution stage for each record of the set of records comprises:

the program instructions being configured upon execution to cause the processor to execute at least one instruction that creates at least one other element.

18. The non-transitory computer readable storage medium of claim 17, wherein the program instructions being configured upon execution to cause the processor to generate the XML document for each record comprising data derived from the data of the corresponding record by executing the instructions of the template during an execution stage for each record of the set of records comprises:

the program instructions being configured upon execution to cause the processor to execute at least one instruction that creates an attribute.

19. The non-transitory computer readable storage medium of claim 18, wherein the program instructions being configured upon execution to cause the processor to generate the XML document for each record comprising data derived from the data of the corresponding record by executing the instructions of the template during an execution stage for each record of the set of records comprises:

the program instructions being configured upon execution to cause the processor to execute at least one instruction that closes the at least one other element.

* * * * *

UNITED STATES PATENT AND TRADEMARK OFFICE
CERTIFICATE OF CORRECTION

PATENT NO. : 8,468,446 B2  
APPLICATION NO. : 11/914017  
DATED : June 18, 2013  
INVENTOR(S) : Rick Molenaar Page 1 of 1

It is certified that error appears in the above-identified patent and that said Letters Patent is hereby corrected as shown below:

In the Claims:

At column 9, claim 3, line 21, after "the", delete "," and at line 26, after "the", delete ",".

At column 10, claim 12, line 26, after "records", insert --to-- and at line 34, change "a function a" to --the function of--.

At column 11, claim 16, line 19, after "records", insert --to--.

Signed and Sealed this  
Third Day of September, 2013

Teresa Stanek Rea  
*Acting Director of the United States Patent and Trademark Office*